May 29, 1945.  V. VOORHEES  2,376,985
PRODUCTION OF STYRENE FROM BUTADIENE
Filed May 23, 1942
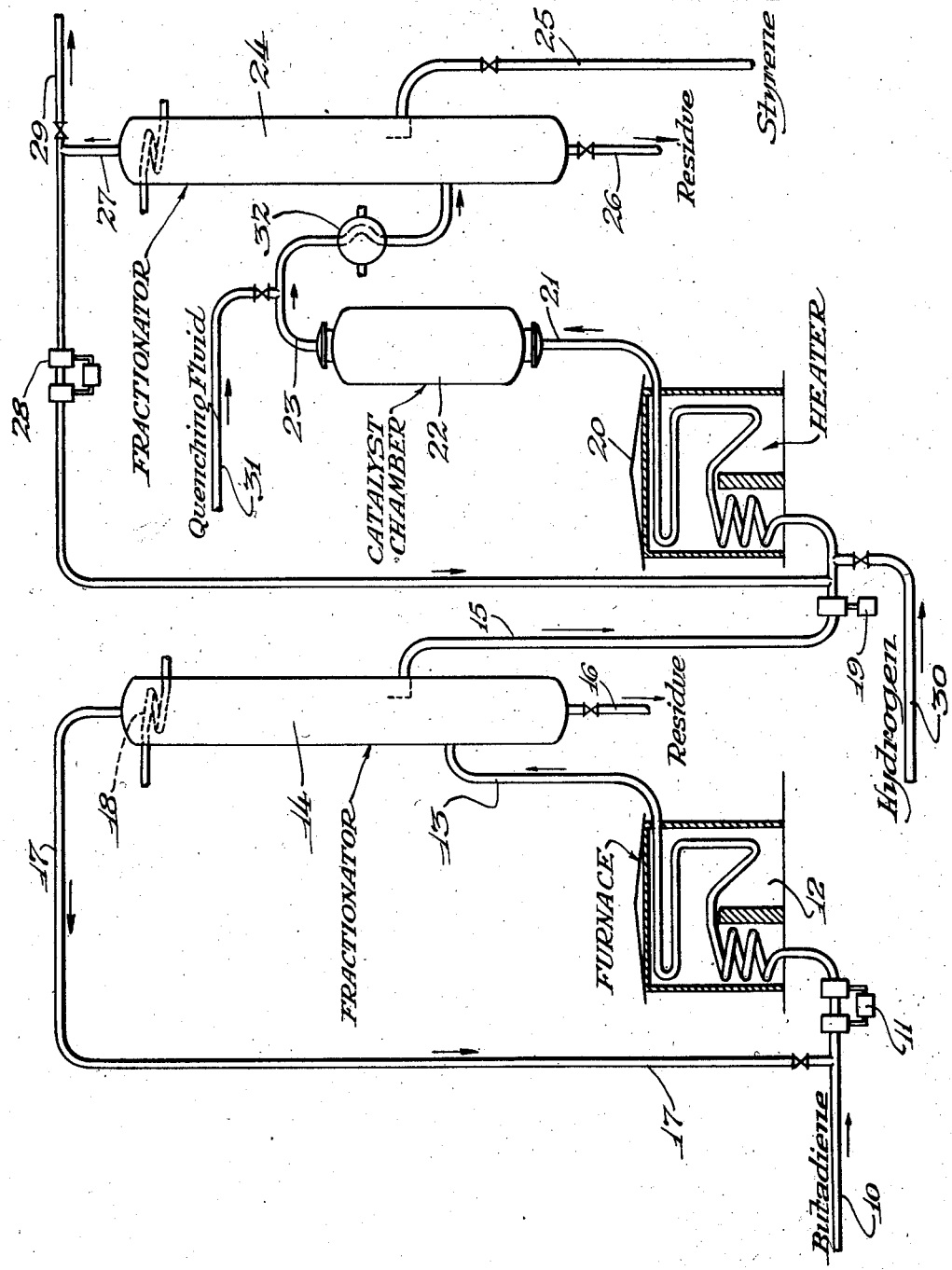
Inventor:
Vanderveer Voorhees
By Pike H. Sullivan
Attorney.

Patented May 29, 1945

2,376,985

UNITED STATES PATENT OFFICE 2,376,985

PRODUCTION OF STYRENE FROM BUTADIENE

Vanderveer Voorhees, Homewood, Ill., assignor to Standard Oil Company, Chicago, Ill., a corporation of Indiana Application May 23, 1942, Serial No. 444,165

1 Claim. (Cl. 260—669)

This invention relates to the preparation of styrene. Heretofore styrene or phenylethylene has usually been obtained from the distillation of coal and by various other pyrolytic processes. Styrene obtained from many of these sources is difficult to purify and the synthesis of styrene from pure materials has generally been costly. It is an object of this invention to prepare styrene in a high state of purity by synthesis from hydrocarbons which are readily available in a high state of purity at moderate cost. The invention is illustrated by a drawing which shows diagrammatically an apparatus for carrying out the process.

I have discovered that styrene can be prepared readily from butadiene in a series of reactions wherein the butadiene is first converted to a dimer and the dimer is then aromatized, preferably at high temperature in the presence of a contact catalyst to yield the desired styrene product. The principal reactions involved are substantially the following:

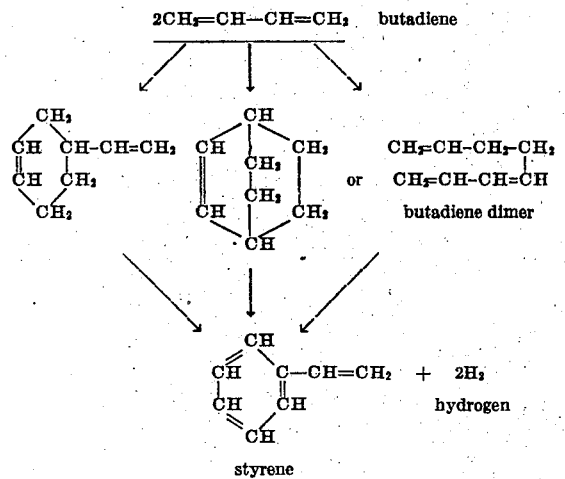

Three structural formulas are suggested for the butadiene dimer, inasmuch as the chemistry of this material is not thoroughly understood. The dimerization reaction may be carried out in various ways and it appears that the chemical character of the dimer changes with different conditions used in its preparation.

One method of effecting conversion of butadiene to the dimer is by heating butadiene at a temperature of about 250 to 500° C., preferably about 300 to 400° C. and at atmospheric pressure or a somewhat higher pressure, e. g., 5 to 10 atmospheres. A catalyst may be used to speed the reaction; for example, I may use aluminum oxide, magnesium oxide, active silica, silica gel, or thorium oxide. The reaction conditions should be controlled to avoid polymerization to higher molecular weight products as far as possible. When using catalysts, for example, a short time of reaction should be provided. Also, it is desirable to limit the conversion per pass to about 50 to 75% of the butadiene, thereby avoiding continued polymerization and further reaction of butadiene with the dimer already formed in the process.

Where higher molecular weight polymers are also desired, for example, in the polymerization of butadiene to elastomers, the reaction conditions may be controlled to produce both the high molecular weight polymer and the dimer. Such reactions are usually conducted in the liquid phase, for example, by treating liquid butadiene with various catalysts such as alkali metals and organic peroxides. This reaction may also be carried out with the liquid butadiene in the form of an aqueous emulsion. The butadiene dimer may also be recovered from the reaction products obtained in the co-polymerization of butadiene with various other unsaturated substances such as styrene, acrylonitrile, and isobutylene.

Where a portion of the butadiene remains unconverted in the dimerization reaction, it may be separated from the dimer and recycled in the process until completely converted. This separation is easily made by distillation, taking advantage of the difference in boiling point of the butadiene and the dimer, the former being a gas and the latter a liquid under ordinary conditions.

In the next step of the process, which involves aromatization of the dimer, the latter is preferably subjected to the action of a contact aromatization catalyst at elevated temperature. For this purpose the dimer may be employed without special purification although it is generally desirable to distill it and remove a small amount of high boiling polymers which may be present before charging it to the aromatization catalyst. The catalyst employed for this operation may be a metal or an oxide of a metal, preferably of the V, VI and VIII groups of the periodic system. Suitable catalysts are the oxides of vanadium, chromium, molybdenum, tungsten or uranium or the VIII group metals, nickel, cobalt, iron, platinum or palladium, or mixtures of any of them with other metals or metal oxides. When employing VIII group metals, it is desirable to avoid contamination with sulfur which poisons the catalysts and decreases their effective life.

The catalyst may be supported on various substances which are generally porous materials of extensive surface and which frequently promote catalytic activity to a large extent. Thus, aluminum oxide, for example alumina gel, bauxite, etc., effectively promotes the action of the V and VI group metal oxides deposited thereon. Such catalysts may conveniently be prepared by applying a solution of ammonium vanadate, ammonium chromate or ammonium molybdate to active alumina, then drying and igniting the product, or salts of the catalytic metals may be added to an alumina sol, for example, an alumina sol derived from the treatment of amalgamated aluminum metal with a weak acid solution, after which the sol may be gelled and dried to give the desired catalyst.

Other supporting substances which may be employed are silica gel, pumice, kieselguhr, asbestos, clays, preferably acid treated clays such as bentonite, montmorillonite or fuller's earth, charcoal, particularly activated charcoal, etc.

The temperature required for the aromatization reaction may vary considerably, generally within the range of about 450 to 800° C., depending on the activity of the particular catalyst employed, time of contact, pressure, and other factors. A suitable temperature when using chromium or molybdenum oxides and a contact time of about 1 to 10 seconds is about 500 to 600° C. The time of contact or reaction time employed in the aromatization of the dimer may vary from 0.1 second to 50 or 100 seconds and it is generally desirable to cool the products of the reaction rapidly in order to prevent secondary reactions, reducing the yield of styrene. Rapid chilling of the reaction products is most conveniently effected by means of a quench wherein a relatively cold fluid, for example, water or oil, is injected into the hot reaction products leaving the aromatization apparatus.

The activity and life of the catalyst in the aromatization reaction are generally improved by maintaining an atmosphere of hydrogen in contact with the catalyst, and hydrogen may be added to the dimer for this purpose. This hydrogen may be obtained by recycling hydrogenous gases produced in the aromatization operation itself. About ½ to 5 mols of hydrogen per mol of dimer treated are sufficient and generally about 2 to 3 mols of hydrogen can be employed with satisfactory results. Before introduction into the reactor the hydrogen may be heated to a high temperature substantially above the reaction temperature as an additional means for supplying the heat necessary for the aromatization reaction.

The aromatization operation may be conducted at atmospheric or sub-atmospheric pressure or at somewhat elevated pressures of the order of 3 to 20 atmospheres. However, low pressures facilitate the use of short contact time and increase the yield of styrene by reducing secondary reactions. Pressures in the range of about 0.2 to 2 atmospheres are therefore preferred. The time of contact of the dimer with the aromatization catalyst may be conveniently indicated by the space velocity expressed in volumes of liquid dimer per hour per volume of catalyst and in general, I may operate with space velocities of about 1 to 10 V/H/V, higher space velocities, e. g., 20 to 30 V/H/V, or even as high as 70 V/H/V being employed for catalysts of very high activity operating at high temperatures, and somewhat lower space velocities, e. g., as low as 0.2, with catalysts of low activity and/or operating at lower temperatures.

Referring to the drawing, a stream of butadiene is charged by line 10 and pump 11 to tubular furnace 12 wherein the stream is heated to the desired dimerization temperature and held at that temperature for a time sufficient to effect formation of a substantial amount of dimer. The vapors are conducted by line 13 to fractionator 14 wherein the products are separated into a dimer fraction withdrawn from trapout 15, a high boiling residue fraction withdrawn by line 16 and an unchanged butadiene fraction taken overhead by line 17 and conducted back to inlet line 10. Reflux for fractionation may be provided by a suitable reflux coil 18.

Dimer withdrawn at 15 is forced by pump 19 through heater 20 and thence by line 21 to aromatization chamber 22 wherein the vapors of the dimer are brought into contact with the aromatization catalyst as described hereinabove. The temperature of the reaction in 22 may be controlled by suitable heat exchange coils, not shown, distributed therein. The aromatized products, chiefly styrene, are withdrawn by line 23 and conducted to fractionator 24 wherein the styrene is separated and withdrawn by trapout line 25. A small amount of heavier products may be withdrawn from the bottom of the tower by line 26 while the hydrogen produced in the process and other gases may be withdrawn by line 27 and returned by pump 28 to heater 20 and thence to reaction chamber 22. Excess hydrogen and other light products may be withdrawn by line 29 if desired and fresh hydrogen may be added to the process by line 30, especially when starting up.

Rapid cooling of the aromatization products from 22 may be effected by injecting quenching fluid into transfer line 23 by line 31. Likewise a cooler 32 may be interposed between the reactor 22 and the fractionator 24 to assist in reducing the temperature of the products below the region in which styrene is lost through secondary reactions.

Any unchanged dimer which may be present in the reaction products from aromatizer 22 may be separated from the styrene product by careful fractionation and returned to the reactor 22. Separation of styrene from unchanged dimer and other hydrocarbons may also be effected by extractive distillation or azeotropic distillation or by converting the styrene to metastyrene which is then readily separated from other products and depolymerized to yield pure styrene. In general, a small amount of unchanged dimer which may be present in the styrene product obtained from aromatizer 22 is not objectionable for most purposes for which the styrene may be desired, for example, in the manufacture of synthetic rubber. However, it is a characteristic of my process that the styrene produced is obtainable in a high state of purity, generally requiring no further purification. A small amount of an antioxidant, for example catechol or butylaminophenol may be added to the styrene product to prevent oxidation and loss by polymerization in processing and in storage.

Although I have described and set forth rather specific operations in the manufacture of styrene, it is intended that the invention be construed broadly in accordance with the claim appended hereto. Modifications of the process which may be employed without departing from the spirit of the invention are intended to be included. Thus, I may regulate conditions to obtain a transfer of hydrogen from one molecule of the dimer to another, resulting in the formation of ethyl benzene, ethyl cyclohexane and styrene. The ethyl benzene and ethyl cyclohexane may thereafter be recycled together or separately to the process or to another step where they are aromatized under different conditions in the presence of a contact catalyst, to produce more styrene. In general, however, I prefer to employ conditions at which olefinic unsaturation is unaffected by hydrogen. Such conditions involve, in general, the use of high temperature and short contact time.

Having thus described my invention what I claim is:

The process of making styrene which comprises polymerizing butadiene by subjecting it to polymerization conditions, separating from the polymerization products a butadiene dimer fraction, aromatizing said butadiene dimer fraction by treating it with an aromatization catalyst at a temperature of about 450 to 800° C. and a space velocity of about 1 to 10 volumes of dimer fraction per hour per volume of catalyst whereby said dimer is converted into styrene and ethyl benzene, recovering styrene from the reaction products and recycling said ethyl benzene to the aromatization operation.

VANDERVEER VOORHEES.